United States Patent [19]

Umsonst et al.

[11] 4,344,767
[45] Aug. 17, 1982

[54] PROCESS FOR COLORING LINEAR POLYESTERS IN THE MELT

[75] Inventors: Gerhard Umsonst, Frenkendorf; Hans P. Kölliker, Münchenstein; Max Jost, Oberwil, all of Switzerland

[73] Assignee: Ciba-Geigy Corporation, Ardsley, N.Y.

[21] Appl. No.: 265,472

[22] Filed: May 20, 1981

[30] Foreign Application Priority Data

May 29, 1980 [CH] Switzerland .................. 4186/80

[51] Int. Cl.³ .................. C09B 1/00; C08L 67/00
[52] U.S. Cl. .................. 524/159; 8/637; 8/679; 260/374; 524/605
[58] Field of Search .............. 8/679, 637; 260/374, 260/40 P

[56] References Cited

U.S. PATENT DOCUMENTS

| | | | |
|---|---|---|---|
| 3,421,828 | 1/1969 | Kolliker et al. | 8/643 |
| 4,001,169 | 1/1977 | Cheetham et al. | 260/40 P |
| 4,176,113 | 11/1979 | Wick et al. | 260/40 P |
| 4,284,411 | 8/1981 | Neeff et al. | 8/637 |

FOREIGN PATENT DOCUMENTS 92461 11/1968 France .

OTHER PUBLICATIONS

Venkataraman's "The Chemistry of Synthetic Dyes", vol. V (Academic Press), 1971, pp. 313–474.

*Primary Examiner*—A. Lionel Clingman
*Attorney, Agent, or Firm*—Harry Falber

[57] ABSTRACT

The invention relates to a process for coloring linear polyesters in the melt. The process comprises the use of 1-hydroxy-4-phenylaminoanthraquinones of the formula

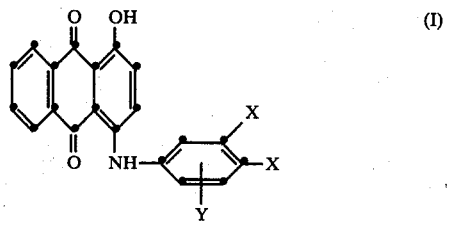

wherein one X is a hydrogen atom and the other is an alkylsulfonyloxy or chloroalkylsulfoxy group and Y is a hydrogen or halogen atom or an alkyl group. The violet shades obtained are distinguished by excellent color strength and purity and also by good fastness properties.

9 Claims, No Drawings

PROCESS FOR COLORING LINEAR POLYESTERS IN THE MELT

It has been found that 1-hydroxy-4-phenylaminoanthraquinones of the formula

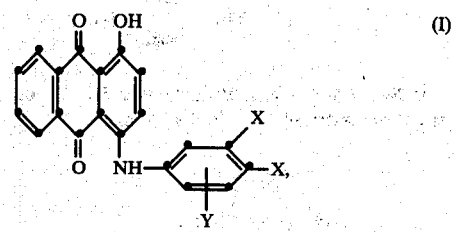

wherein one X is a hydrogen atom or methyl group and the other is an alkylsulfonyloxy or chloroalkylsulfonyloxy group, preferably one containing 1 to 4 carbon atoms, and Y is a hydrogen or halogen atom or an alkyl group, are most suitable for colouring linear polyesters in the melt.

A halogen atom Y in the above formula I is preferably a chlorine atom, and an alkyl group Y is preferably the methyl group.

Preferred colorants of the formula I are those in which X is a methylsulfonyl group and Y is a hydrogen atom.

Some of the colorants of the formula I are known compounds and can be obtained by the process described in German Pat. No. 1,644,536.

Instead of using homogeneous colorants it is also possible to use mixtures of different compounds of the formula I or mixtures of one or more compounds of the formula I with other colorants which are suitable for colouring linear polyesters in the melt.

Suitable linear polyesters are in particular those which are obtained by the polycondensation of terephthalic acid or esters thereof with glycols of the formula HO—(CH$_2$)$_n$—OH, in which n is an integer from 2 to 10, or with 1,4-di(hydroxymethyl)cyclohexane, or by the polycondensation of glycol ethers of hydroxybenzoic acids, for example p-($\beta$-hydroxyethoxy)-benzoic acid. The term "linear polyesters" also comprises copolyesters which are obtained by partial replacement of terephthalic acid by another dicarboxylic acid or by a hydroxycarboxylic acid and/or by partial replacement of the glycol by another diol. The preferred linear polyesters, however, are polyethylene terephthalates.

Coloration is effected by the conventional methods, for example by mixing the colorants with the plastics material in granulate or particulate form and extruding the mixture to fibres, sheets or granules. These latter can then be moulded to objects by injection moulding.

The colorations obtained by distinguished by good fastness to light, washing, dry cleaning, cross-dyeing, thermofixation, bleeding and chlorite bleaching, as well as by good fibre viscosity values, good fastness to rubbing after thermofixation, pure shades, and good colour strength.

The invention is illustrated by the following Examples, in which parts and percentages are by weight, unless otherwise stated.

EXAMPLE 1

An undulled polyethylene terephthalate granulate suitable for fibre manufacture in shaken in a closed vessel for 15 minutes on a mechanical shaker together with 1-hydroxy-4-p-methylsulfonyloxy-phenylaminoanthraquinone prepared in accordance with Example 4 of German Pat. No. 1,644,536. The uniformly coloured granules are then spun in a melt spinning machine (285° C.±3° C., sojourn time in the spinning machine about 5 minutes) to filaments, which are stretched and wound on a draw twister. The solubility of the colorant in polyethylene terephthalate results in a strong bluish-violet coloration of pure shade, good lightfastness, and excellent fastness to washing, dry cleaning, cross-dyeing, sublimation and rubbing after thermofixation.

The heat resistance of the colorant and the good melt filtration properties permit a smooth operation of the spinning unit.

EXAMPLE 2

1000 parts of polyethylene terephthalate granules, 10 parts of titanium oxide (Kronos RN 40) and 1 part of the finely dispersed colorant used in Example 1 are mixed in a closed vessel on a roller gear table. The coloured granules are extruded at about 260° C. to strands of 2 mm, which are re-granulated. The resultant granules are processed at 270°–280° C. in a screw injection moulding machine to mouldings. The bluish-violet coloration obtained is of good light-fastness.

EXAMPLES 3–10

The following table lists further colorants of the formula

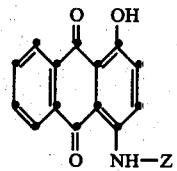

wherein Z has the meaning given in column II. They colour polyester fibres in the shades indicated in column III by the procedure described in Example 1.

| Example | Z | Shade |
|---|---|---|
| 3 | ⟨⟩—OSO$_2$CH$_3$ | violet |
| 4 | ⟨⟩(OSO$_2$CH$_3$)—CH$_3$ | " |
| 5 | ⟨⟩(CH$_3$)—OSO$_2$CH$_3$ | " |
| 6 | ⟨⟩—OSO$_2$CH$_2$Cl | bluish-violet |

What is claimed is:
1. A process for coloring linear polyesters in the melt, which process comprises the use of a 1-hydroxy-4-phenylaminoanthraquinone of the formula

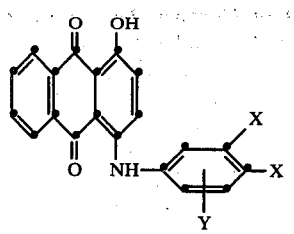

wherein one X is a hydrogen atom or methyl group and the other is an alkylsulfonyloxy or chloroalkylsulfonyloxy group and Y is a hydrogen or halogen atom or an alkyl group.

2. A process according to claim 1, wherein the colorant is a compound of the formula I, in which one X is an alkylsulfonyloxy or chloroalkylsulfonyloxy group of 1 to 4 carbon atoms and the other is hydrogen or methyl, and Y is hydrogen.

3. A process according to claim 2, wherein the alkylsulfonyloxy group is the methylsulfonyloxy group.

4. A process according to claim 1, wherein the colorant is a compound of the formula

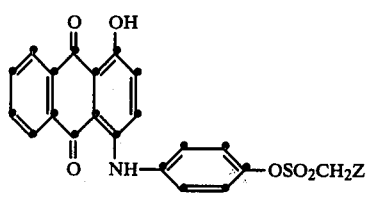

wherein Z is hydrogen or chlorine.

5. A process according to claim 1, wherein the colorant is a compound of the formula

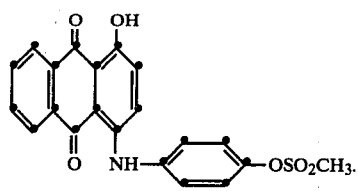

6. A process according to claim 1, wherein the colorant is a compound of the formula

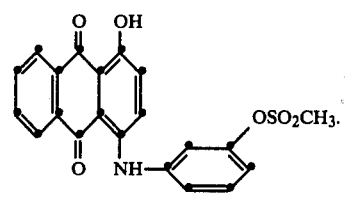

7. A process according to claim 1, wherein the colorant is a compound of the formula ![structure with OSO2CH3 and CH3 substituents]

8. A process according to claim 1, wherein the colorant is a compound of the formula ![structure with CH3 and OSO2CH3 substituents]

9. A melt colored linear polyester which contains a colorant according to claim 1.

* * * * *